United States Patent [19]
McCafferty et al.

[11] Patent Number: 5,640,322
[45] Date of Patent: Jun. 17, 1997

[54] SYSTEM FOR CONTROLLING THE OPERATION OF A VEHICULAR TRANSMISSION

[75] Inventors: Bradley Lee McCafferty, Zionsville, Ind.; Martin Robert Dadel, Plainfield, Ind.

[73] Assignee: General Motors Corporation, Detroit, Mich.

[21] Appl. No.: 596,879

[22] Filed: Jan. 11, 1996

Related U.S. Application Data

[63] Continuation of Ser. No. 356,827, Dec. 15, 1994, abandoned.

[51] Int. Cl.$^6$ ........................................... G06G 7/70
[52] U.S. Cl. .................. 364/424.1; 477/96; 477/187; 477/196; 192/4 B
[58] Field of Search .................. 364/424.1, 424.01, 364/426.01; 477/96, 187, 196, 131, 138, 161, 155, 154, 65; 192/4 B, 12 A, 3.3, 3.58, 103 F, 3.29; 188/294, 290

[56] References Cited

U.S. PATENT DOCUMENTS

| | | | |
|---|---|---|---|
| 4,779,489 | 10/1988 | Haley | 477/98 |
| 4,898,361 | 2/1990 | Bender et al. | 251/129.05 |
| 4,932,246 | 6/1990 | Deutsch et al. | 73/119 A |
| 5,063,813 | 11/1991 | Lentz | 477/131 |
| 5,115,395 | 5/1992 | Petzold | 364/424.1 |
| 5,179,874 | 1/1993 | Hunter | 192/3.58 |
| 5,190,130 | 3/1993 | Thomas et al. | 192/3.31 |
| 5,399,130 | 3/1995 | Long | 477/130 |
| 5,404,301 | 4/1995 | Slicker | 364/424.1 |

*Primary Examiner*—Kevin J. Teska
*Assistant Examiner*—Jacques Louis-Jacques
*Attorney, Agent, or Firm*—Donald F. Scherer

[57] ABSTRACT

A system to control the operation of a vehicular transmission embodying the concepts of the present invention utilizes a controller, at least one pulse width modulation solenoid valve and a torque transfer device operatively controlled by each of the solenoid valves so as to regulate a transmission system. The controller operatively imposes not only a varying modulation frequency on each of the solenoid valves, but also a varying modulation duty cycle on each of the solenoid valves. The controller also operatively varies the modulation rate of said frequency and said duty cycle of the fluid pressure operating the plurality of torque transfer devices, thus controlling the operation of each solenoid valve such that it does not impose a torque spike on the operation of the transmission as each solenoid valve applies fluid pressure to the appropriate torque transfer device. Accordingly, the controller provides smooth and quiet operation of the transmission.

7 Claims, 2 Drawing Sheets

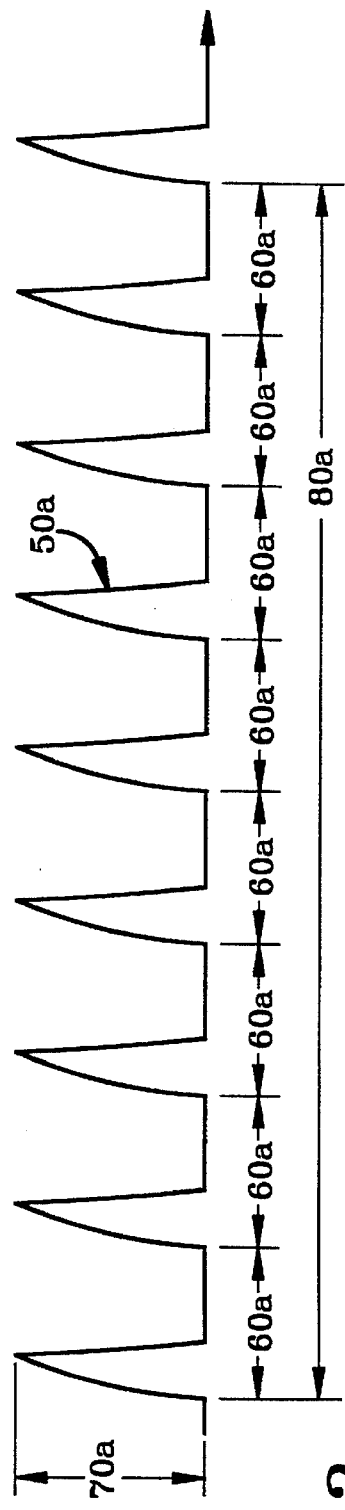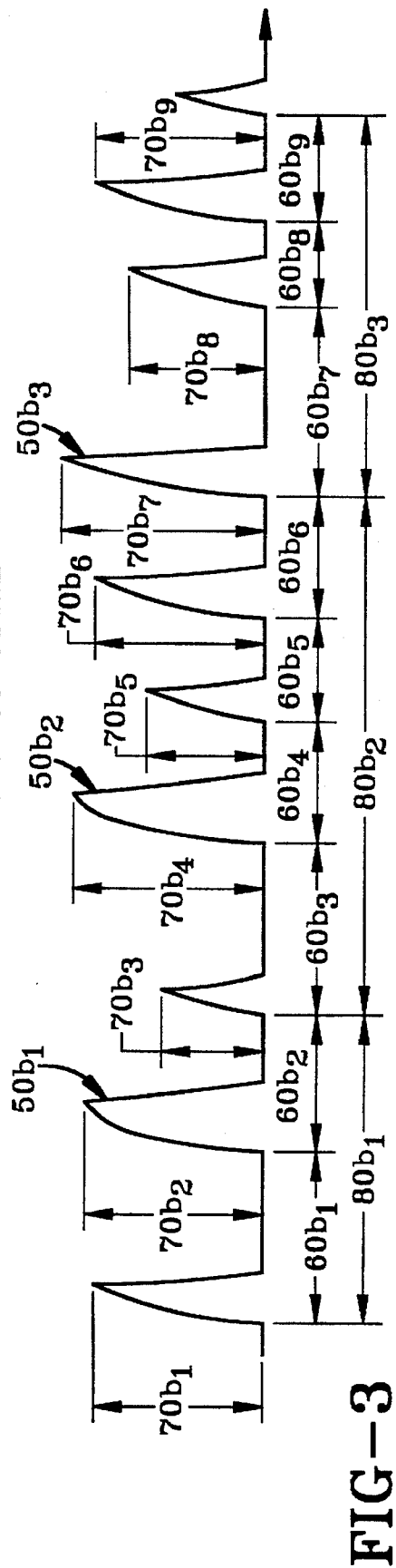

SYSTEM FOR CONTROLLING THE OPERATION OF A VEHICULAR TRANSMISSION

This is a continuation of application Ser. No. 08,356,827 filed on 15 December 1994, now abandoned.

TECHNICAL FIELD

The present invention relates generally to controlling the operating pressures for one or more torque transfer devices—typically clutches or brakes—in a vehicular transmission. More particularly, the present invention relates to controlling solenoid valves within the transmission, the solenoid valves regulating the amount of fluid pressure within a like number of transmission torque transfer devices in order to achieve smooth operation of the transmission, and thereby the vehicle. By controlling the solenoid valves, shift noise in the transmission is reduced and smooth operation of the vehicle is achieved as the vehicle increases or decreases its speed. Specifically, the present invention relates to the control of oncoming torque transfer devices for a transmission system utilizing pulse width modulating (PWM) solenoid valves.

BACKGROUND OF THE INVENTION

The use of torque transfer devices in association with the operation of a vehicular transmission is well known in the art. The transmission of a vehicle functions to deliver the power received from an engine through a progressive variety of gear ratios so as most effectively to drive one or more axles of the vehicle. In a vehicle with an automatic transmission (a transmission system in which the driver does not directly control when the gear ratios are to be changed), a control unit senses the speed of the vehicle and determines when the torque transfer devices—typically clutches or brakes—that control the speed changing gears are to be activated or deactivated. To activate or deactivate these torque transfer devices by fluid pressure, various types of solenoid valves may be used.

Prior art control systems in hydraulically actuating transmissions typically utilize pulse width modulating (PWM) solenoid valves actuated from the transmission controller directly to control oil pressure applied to torque transfer devices.

It is well known that a solenoid is a length of wire that is coiled such that when an electrical current flows through the wire a movable core is drawn into the coil. The solenoid is, therefore, readily capable of opening or closing either a normally open or a normally closed valve, and the solenoid operating variety of such valves are commonly designated as solenoid valves.

Torque transfer devices—whether operating as clutches or brakes—used in an automatic transmission utilize a force, such as that supplied by pressurized fluid, to activate and deactivate the torque transfer device. Torque transfer devices have two relatively movable parts that may be engaged or disengaged without bringing either of the moving parts to rest. Typically, the pressurized oil is applied to force one of the moving parts into a frictionally driving relationship with the other moving part, and at the desired speed. To achieve this, the transmission controller activates a desired solenoid valve in the transmission system by applying a voltage differential across the coil such that the solenoid valve is activated from either its normally closed or normally open state.

In normal operation, the transmission controller modulates the PWM solenoid voltage at a constant frequency with a varying duty cycle (also known as voltage signal amplitude) as it delivers the fluid pressure to the torque transfer device. Unfortunately, when the voltage signal—and thus the fluid pressure—is modulated at a constant frequency, a corresponding torque spike may be transmitted throughout the entire drive system of the vehicle. Consequently, these torque spikes will generally result in a "bad shift" (the moving parts of the torque transfer device do not properly align) or a "loud shift" (the moving parts of the torque transfer device make noise as they become properly aligned). This drawback is emphasized if the torque spikes are of the correct frequency or magnitude to "excite" the vehicle system. Rotating torque transfer devices are particularly susceptible to bad shift and loud shift problems, which combine to cause shift "growl". Shift "growl" is most prevalent in transmissions used in light stiff vehicles such as a bus.

To eliminate these torque spike problems, the prior art teaches the use of spring packs to absorb the bad or loud shifting caused by modulating the fluid pressure at a constant frequency. Alternatively, more expensive proportional solenoid valves can be incorporated into the transmission system to smooth out the resulting torque spikes. Other hardware, such as A/R valves, accumulator springs and hydraulic accumulators, may be utilized to provide a smoother quieter ride for the vehicle system.

While attempts have been made to provide smooth running, noise-free automatic transmissions, the prior art has not provided a controller which assures a smooth running transmission. The present invention provides a quiet smooth operation of the transmission by employing pulse width modulating solenoid valves controlled so as to prevent such unfavorable shifting characteristics.

SUMMARY OF THE INVENTION

It is, therefore, a primary object of the present invention to provide a novel controller for an automatic, vehicular transmission system that operates more smoothly and quietly than prior known vehicular transmission systems.

It is another object of the present invention to provide a transmission controller, as above, that can automatically vary the frequency, the amplitude, and the rate at which the frequency and amplitude of the electrical signal which operates the solenoid valves that control the fluid pressure by which the torque transfer devices effect shifting of the transmission.

It is a further object of the present invention to provide a transmission controller, as above, that eliminates torque spikes within the transmission system.

It is a still further object of the present invention to provide a transmission controller, as above, that is easy to manufacture, reliable and produces a cost savings over prior known transmission controllers.

These and other objects of the invention, as well as the advantages thereof over existing and prior art forms, which will be apparent in view of the following detailed specification, are accomplished by means hereinafter described and claimed.

In general, a system to control the operation of a vehicular transmission embodying the concepts of the present invention utilizes a controller, at least one pulse width modulation solenoid valve and a torque transfer device operatively controlled by each of the solenoid valves so as to regulate a transmission system.

The controller operatively imposes not only a modulation frequency on each of the solenoid valves, but also a modulation duty cycle on each of the solenoid valves. The controller also operatively determines the modulation rate of said frequency and said duty cycle.

To acquaint persons skilled in the arts most closely related to the present invention, one preferred embodiment of a transmission clutch pressure controller that illustrates a best mode now contemplated for putting the invention into practice is described herein by, and with reference to, the annexed drawings that form a part of the specification. The exemplary transmission clutch pressure controller is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

BRIEF DESCRIPTION OF THE DRAWINGS

FIG. 2 is a prior art time chart for a prior art pulse width modulating solenoid valve which is controlled by an electrical signal having a constant frequency and a constant rate of modulation; and, FIG. 3 is a time chart for a pulse width modulating solenoid which is controlled by an electrical signal having a variable modulation frequency, a variable duty cycle and a variable rate of modulation as taught by the present invention.

DESCRIPTION OF AN EXEMPLARY EMBODIMENT

Figure 1:
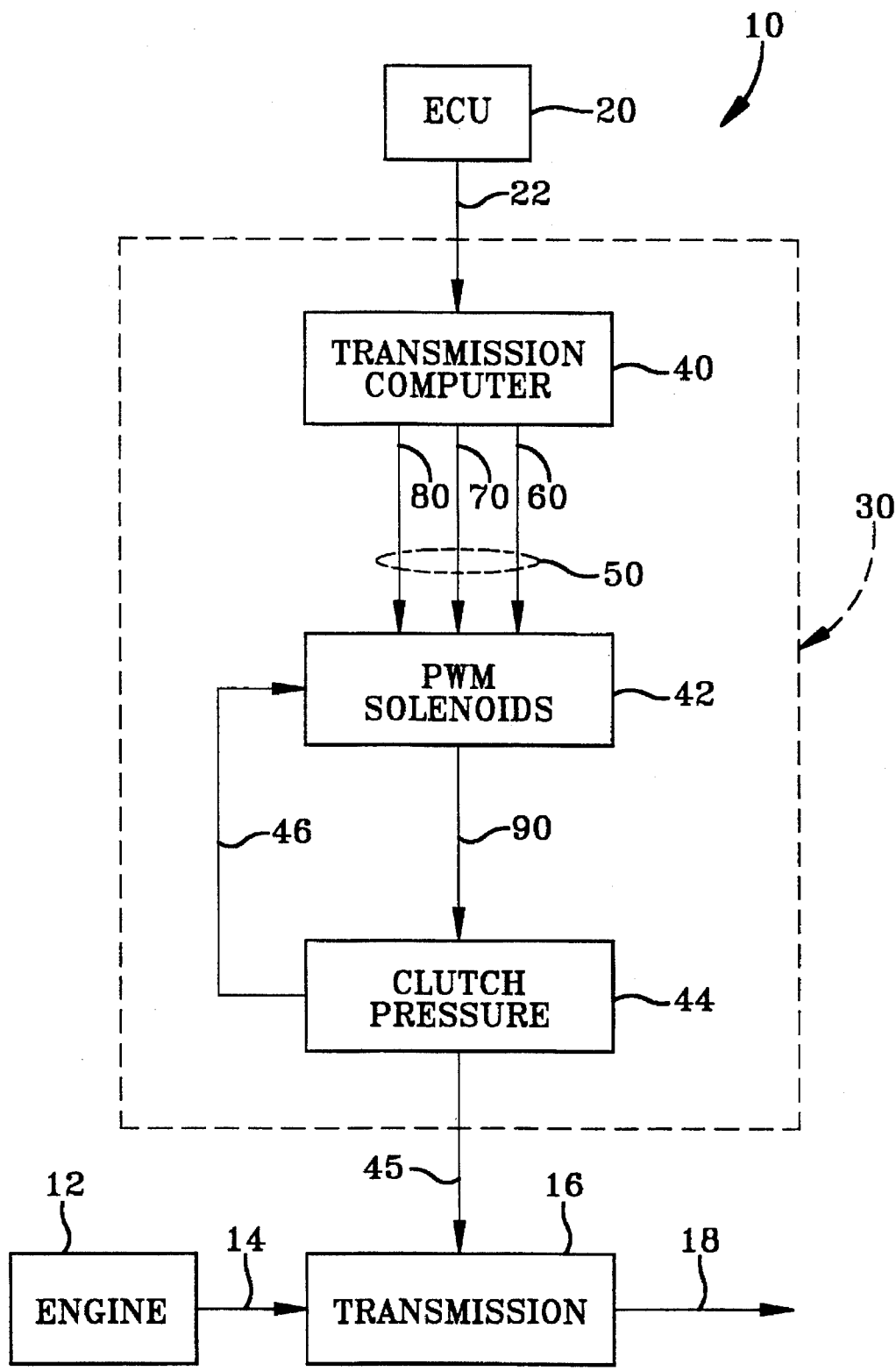
FIG. 1 is a schematic diagram of a transmission controller which embodies the concepts of the present invention and which is depicted in conjunction with the transmission, a source of power and an electrical control unit.

One representative form of a vehicular transmission system embodying the concepts of the present invention is designated generally by the numeral 10 on the accompanying drawings. With reference to FIG. 1, the representative transmission system 10 operates in conjunction with an engine 12 to provide input power, as by a shaft 14, to an automatic transmission 16 which supplies output driving power, as through a shaft 18. Those skilled in the art will appreciate that the transmission 16 incorporates the necessary gear sets, support shafts, conduits and shifting mechanism to transfer the input power delivered to the input power shaft 14 from a fossil fuel engine 12—or an electric storage device, such as a battery—into an output mean, such as a drive shaft 18, for propelling a vehicle (not shown).

The operator of the vehicle has three primary devices to control the transmission 16. One of the primary control devices is a well known drive range selector (not shown) that directs an electrical control unit (ECU) 20 to configure the transmission 16 for either the park, reverse, neutral, or forward drive range. The second and third primary control devices constitute an accelerator pedal (not shown) and a brake pedal (also not shown). The information obtained by the ECU 20 from these three primary control sources is often referred to as the "operator demand". The ECU 20 also obtains information from the transmission 16 and the engine 12 such as output speed and throttle settings. In response to an operator's action, the ECU 20 determines what is required and then manipulates the selectively operated components of the transmission 16 appropriately to respond to the operator demand.

A transmission controller, generally designated by the numeral 30, receives a control signal through conductor 22 from the ECU 20 so as to provide a smooth transition, with minimum noise, when the transmission 16 changes the gear drive ratios available from the transmission 16. The controller 30 may be utilized in a vehicle such as an automobile, bus, or track (not shown). In general, the transmission controller 30 includes a transmission computer 40, a plurality of pulse width modulation (PWM) solenoid valves 42 and a like plurality of torque transfer devices 44.

Because of the close interrelation in the operation of the transmission computer 40, the PWM solenoid valves 42 and the torque transfer devices 44, they are depicted within the controller 30, and the transmission 16 is depicted as separated therefrom. In reality, however, at least the PWM solenoid valves 42 and the torque transfer devices 44 may be physically within the transmission 16, or at least in close physical proximity thereto. No matter how the components are schematically depicted, it must be appreciated that the torque transfer devices 44 are employed to control and regulate the rotation of the various, and well known, gears and/or supporting shafts (not shown) that are contained within the transmission 16.

In any event, the transmission computer 40 controls and generates a transmission signal 50 which includes a modulation frequency signal 60, a duty cycle signal 70 and a rate of modulation signal 80. The composite transmission signal 50 is sent to the plurality of PWM solenoid valves 42 for the purpose of instructing each solenoid valve 42 to change from its respective normally closed or normally open state to an opposite position as required. Working in concert, the solenoid valves 42 are responsive to the transmission signal 50 and generate a pressure signal 90 that applies the proper mount of fluid pressure operatively to control the torque transfer devices 44 which operatively function to control the transmission, as represented by the arrow 45 on FIG. 1. The changing amount of oil pressure applies or releases the torque transfer devices 44 so as to control the power output from the transmission 10 to the drive shaft 18. A feedback pressure signal 46 is generated by the torque transfer devices 44 and is fed back to the PWM solenoid valves 42.

Referring now to FIG. 2, an example of a prior art signal sent from a transmission computer to PWM solenoid valves is shown. The components of the prior art signal generated by a transmission computer are designated by the suffix "a". As depicted on the prior art signal graph (FIG. 2), each transmission signal 50a includes three distinct signal components. First, a modulation frequency signal component 60a modulates the fluid pressure at a constant frequency of 63 Hertz. In other words, the modulation cycle signal 60a is the number of times the transmission signal 50a is sent from the prior art transmission computer to the prior art PWM solenoid valves per second. The period of the modulation frequency signal 60a never changes.

Second, a duty cycle signal component 70a is generated which controls the amplitude of the signal 50a transmitted to the prior art PWM solenoid valves. In the prior art, the duty cycle signal component 70a has been varied from zero percent (0%) to one hundred percent (100%), but only at predetermined periods of time.

Third, the prior an transmission computer generates a rate of modulation signal component 80a. The rate of modulation signal 80a adjusts the modulation duty cycle 70a once every 60 Hertz. The modulation duty cycle signal 70a (signal amplitude) is adjusted depending upon input to the prior art transmission computer.

As will be appreciated by those skilled in the art, the modulation cycle signal 60a and the rate of modulation signal 80a sent from the prior art transmission computer to the prior an PWM solenoid valves are held constant. As a result, when the fluid pressure is modulated at a constant frequency—and the amplitude of the signal is only updated at a constant rate—excess fluid pressure accumulates within the prior art transmission system. This excess fluid pressure results in torque spikes being transmitted throughout the vehicle. These torque spikes result in a "bad shift" (the clutch is not completely engaged) or a "loud shift" (the clutch is engaged, but only after making loud noises), especially if the torque spikes are of the correct frequency to "excite" the vehicle. In other words, predictable periodic pressure cycles develop within the prior art transmission system that must be relieved for the transmission to function properly.

To relieve this anomaly of pressure, a torque spike may be generated which interferes with the operation of the transmission 10. A combination of a "bad shift" and a "loud shift" is exemplified when the vehicle system is shifted from neutral to drive, this combination is sometimes called shift "growl". Shift "growl" is most prevalent when a prior art transmission system is used in conjunction with a light weight vehicle system, such as a bus.

Referring now to FIG. 3, the exemplary embodiment of the present invention depicted herein resides in the ability of the transmission computer 40 to control and vary all of the signals 60, 70 and 80 of the transmission signal 50 sent to the PWM solenoid valves 42. For clarity, the signals generated by the transmission computer 40 in conformity with the present invention are designated with a "b" suffix, and, where required, components of each signal have a further numerical subscript. For example, a modulation frequency signal is shown in FIG. 3 as 60b. In the preferred embodiment, the transmission computer 40 can vary the frequency of the modulation cycle 60b from 32 Hertz to 102 Hertz. The modulation duty cycle signal 70b can be varied from zero percent (0%) to one hundred percent (100%) so as to control the amplitude of the transmission signal 50b sent to the PWM solenoid valves 42 for each modulation cycle 60b.

The transmission computer 40 can also control the rate of modulation signal 80b which updates the modulation duty cycle signal 70b. Therefore, because the transmission computer 40 can vary how often the frequency and the amplitude of the transmission signal 50b are modified, a fluctuating transmission signal 50b is imposed on the PWM solenoid valves 42.

Therefore, by modifying the modulation frequency signal 60b, the modulation duty cycle signal 70b and the rate of modulation signal 80b, it is possible to randomly change the frequency and amplitude of the transmission signal 50b to operate the solenoids 42. The random characteristic of the signal 50b prevents the torque transfer devices 44 from developing predictable periodic pressure cycles that ultimately cause torque spikes. As a result, use of the present invention prevents "bad" or "loud" shifts from occurring.

As seen in FIG. 3, the variation of the transmission signal 50b can best be appreciated by examining three characteristics in each of three representative transmission signals $50b_1$, $50b_2$, and $50b_3$. Specifically, transmission signal $50b_1$ has a rate of modulation signal $80b_1$ that only lasts two periods of modulation cycle signals $60b_1$ and $60b_2$, respectively. On the other hand, transmission signal $50b_2$ has a rate of modulation signal $80b_2$ that has four periods of modulation cycle signals $60b_3$, $60b_4$, $60b_5$ and $60b_6$, respectively. Similarly, transmission signal $50b_3$ has a rate of modulation signal $80b_3$ that has three periods of modulation cycle signals $60b_7$, $60b_8$ and $60b_9$, respectively.

Of course, the rate of modulation 80b could contain any number of modulation cycle signals $60b_n$ (where "n" is an integer) that the computer 40 deems appropriate. Furthermore, within each successive rate of modulation signal $80b_n$ a subsequent modulation cycle signal $60b_{(n\pm x)}$ (where "x" is an integer that is $\leq$ than "n") preferably has a different value modulation duty cycle signal $70b_{(n\pm y)}$ (where "y" is also an integer that is $\leq$ than "n") than the previous modulation cycle signals $60b_n$ or $70b_n$. In other words, each duty cycle signal $70b_{(n\pm y)}$ has a value different than the previous duty cycle signal $70b_n$. Therefore, this variation of transmission signal 50b provides a transmission system 18 that does not suffer from damaging torque spikes.

Those skilled in the art will appreciate that in the prior art transmission, if a solenoid is required to be open fifty percent (50%) of the time, the controller generates a constant frequency signal to do so. Unfortunately, this generates undesirable torque spikes within the transmission. The controller 30 of the present invention receives the same input and generates an output to ensure that the solenoid is open fifty percent (50%) of the time. In contrast to the prior art, the controller would generate a transmission signal 50 that has a variable frequency and a variable duty cycle to provide the desired output without torque spikes being generated.

While only a preferred embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a transmission clutch pressure controller embodying the concepts of the present invention is capable of providing a transmission system that is smooth running and quiet, but also that the other objects of the invention can be likewise accomplished.

The embodiments of the invention in which an exclusive property or privilege is claimed are defined as follows:

What is claimed is:

1. A system to control the operation of a vehicular transmission, said system comprising:

controller means;

at least one pulse width modulation solenoid valve;

at least one torque transfer device;

said at least one pulse width modulating solenoid valve imposing a modulation frequency as well as a modulation duty cycle on said at least one torque transfer device;

said controller means randomly varying said modulation frequency to provide a fluctuating modulation frequency;

said controller means randomly varying said modulation duty cycle to provide a fluctuating duty cycle; and each of said at least one torque transfer device operatively controlled by said controller means randomly varied, fluctuating modulation frequency and said controller means randomly varied, fluctuating duty cycle imposed on each said solenoid valve by said controller means for regulating the operation of the vehicular transmission.

2. A system to control the operation of a vehicular transmission, as set forth in claim 1, wherein:

said controller means allows said modulation duty cycle to be varied from zero percent (0%) to one hundred percent (100%).

3. A system to control the operation of a vehicular transmission, said system comprising:

controller means;

at least one pulse width modulation solenoid valve;

at least one torque transfer device;

said controller means supplying:
 a modulation frequency;
 a modulation duty cycle; and,
 a rate of modulation of said frequency and said duty cycle;

said controller means varying:
 said modulation frequency;
 said modulation duty cycle; and,
 said rate of modulation;

said rate of modulation randomly changes said modulation frequency and said modulation duty cycle;

said at least one pulse width modulation solenoid valve operatively responsive to said randomly changed modulation frequency and said randomly changed modulation duty cycle; and said at least one torque transfer device operatively controlled by said at least one solenoid valve for regulating the operation of the vehicular transmission.

4. A transmission controller for receiving operator demand, pulse width modulation solenoid valves responsive to a modulation frequency and a modulation duty cycle operatively controlled by said controller means, torque transfer means operatively controlled by said solenoid valves for regulating a transmission system, wherein the improvement comprises:

means for varying the modulation frequency imposed on said solenoid valves;

means for varying the modulation duty cycle imposed on said solenoid valves; and, means for controlling a rate of modulation of the modulation frequency and the modulation duty cycle, wherein said rate of modulation randomly changes said modulation frequency and said modulation duty cycle for regulating the transmission system.

5. A transmission controller, as set forth in claim 4, further comprising:

means for varying said modulation duty cycle from zero percent (0%) to one hundred percent (100%).

6. A system to control the operation of a vehicular transmission, said system comprising:

a torque transfer device;

a solenoid valve controlling said torque transfer device;

said solenoid valve having a first operational position and a second operational position;

said solenoid valve alternating between said first operational position and said second operational position at a modulation frequency;

said solenoid valve alternating between operation for a first time period in said first operational position and operation for a second time period in said second operational position at a modulation duty cycle;

a controller generating a signal for varying said modulation frequency and said modulation duty cycle of each said solenoid valve;

said solenoid valve receiving said transmission signal and varying its said modulation frequency and said modulation duty cycle in response to said signal for regulating the operation of the vehicular transmission system.

7. A system to control the operation of a vehicular transmission, said system comprising:

a least one torque transfer device;

at least one solenoid valve controlling said torque transfer device;

each at least one said solenoid valve having a modulation frequency and a modulation duty cycle; and a controller generating a composite signal received by each at least one said solenoid valve for providing a randomly varying modulating frequency and modulation duty cycle of each at least one said solenoid valve;

each at least one said solenoid valve receiving said composite signal and randomly varying its said modulation frequency and its said modulation duty cycle in response to said composite signal;

said composite signal inducing a modulation frequency signal, a duty cycle control signal and a rate of modulation signal; and each at least one said torque transfer device operatively controlled by said randomly varied modulation frequency and duty cycle imposed on each said solenoid valve by said controller for regulating the operation of the vehicular transmission.

* * * * *